US011210235B2

(12) United States Patent
Danilov et al.

(10) Patent No.: US 11,210,235 B2
(45) Date of Patent: Dec. 28, 2021

(54) LOAD BALANCING IN A DATA STORAGE SERVICE VIA DATA STRUCTURE REDISTRIBUTION

(71) Applicant: EMC IP Holding Company LLC, Hopkinton, MA (US)

(72) Inventors: Mikhail Danilov, Saint Petersburg (RU); Konstantin Buinov, Prague (CZ)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 143 days.

(21) Appl. No.: 16/594,338

(22) Filed: Oct. 7, 2019

(65) Prior Publication Data

US 2021/0103526 A1 Apr. 8, 2021

(51) Int. Cl.
| | | |
|---|---|---|
| *G06F 12/00* | (2006.01) |
| *G06F 12/122* | (2016.01) |
| *G06F 12/1009* | (2016.01) |
| *G06F 9/50* | (2006.01) |

(52) U.S. Cl.
CPC ......... *G06F 12/122* (2013.01); *G06F 9/5016* (2013.01); *G06F 12/1009* (2013.01); *G06F 2212/1016* (2013.01)

(58) Field of Classification Search
CPC .. G06F 12/122; G06F 12/1009; G06F 9/5016; G06F 2212/1016
See application file for complete search history.

(56) References Cited

U.S. PATENT DOCUMENTS

| | | | | |
|---|---|---|---|---|
| 7,120,792 B1* | 10/2006 | Jacobson | .................. | H04L 9/08 713/153 |
| 7,587,431 B1* | 9/2009 | Rao | ...................... | G06F 11/1471 |
| 7,647,466 B1* | 1/2010 | Rao | ......................... | G06F 16/22 711/170 |
| 7,756,831 B1* | 7/2010 | Rao | ..................... | G06F 11/1471 707/638 |
| 2010/0318626 A1* | 12/2010 | Abts | ..................... | G06F 12/109 709/216 |
| 2012/0017042 A1* | 1/2012 | Matsui | ................... | G06F 3/061 711/114 |
| 2013/0091333 A1* | 4/2013 | Marisamy | ........... | G06F 11/3409 711/162 |
| 2014/0379722 A1* | 12/2014 | Mysur | ..................... | G06F 3/067 707/740 |

(Continued)

*Primary Examiner* — Prasith Thammavong
(74) *Attorney, Agent, or Firm* — Amin, Turocy & Watson, LLP

(57) ABSTRACT

The technology described herein is directed towards balancing workload between cluster nodes via redistribution of metadata data structures (e.g., memory tables corresponding to directory table partitions). Workload-related information of a node and its partitions' primary memory tables usage is measured, and if sufficiently high, causes a move of a highly-accessed memory table (corresponding to high workload on a first node) from the first node to a second node that has less workload. The second node can contain a backup (e.g., shallow) memory table to the primary node, whereby the move can be a logical move that transforms the backup memory table into a new instance of the primary memory table on the second node. The first node's primary memory table can be deflated into a backup table on the first node that backs up the new instance of the primary table on the second node.

20 Claims, 12 Drawing Sheets

(56) References Cited

U.S. PATENT DOCUMENTS

| | | | |
|---|---|---|---|
| 2018/0336142 A1* | 11/2018 | Pellegrini | G06F 12/1027 |
| 2018/0349287 A1* | 12/2018 | Kan | G06F 12/1009 |
| 2020/0174665 A1* | 6/2020 | Danilov | G06F 11/2074 |
| 2020/0201814 A1* | 6/2020 | Danilov | G06F 16/1734 |

* cited by examiner

LOAD BALANCING IN A DATA STORAGE SERVICE VIA DATA STRUCTURE REDISTRIBUTION

TECHNICAL FIELD

The subject application generally relates to data storage, and, for example, to a data storage system of nodes that distribute metadata data structures among the nodes, and related embodiments.

BACKGROUND

Contemporary cloud-based data storage systems, such as ECS (formerly known as ELASTIC CLOUD STORAGE) provided by DELL EMC, can be based on a cluster of nodes that each own some part of the stored data (and can store redundant data owned by other nodes for data protection purposes). For example, user data can be stored in a repository and the metadata associated with the user data stored in search trees owned by a given node.

Trees are maintained in non-volatile memory, and to save on the resource cost of data updates, ECS implements bulk tree updates. More particularly, when an update operation occurs, information about the operation goes into a tree journal as a journal record, also maintained in non-volatile memory.

For efficiency in serving update requests, a node that owns a tree keeps an effective state of the tree (which takes into account the tree's data and updates thereto in the tree's journal) in a memory table in fast, volatile memory. Eventually when space is needed (e.g., based on a total combined footprint of a node's memory tables), a node dumps its memory tables into nonvolatile storage, with each memory table dumped as a new version of the corresponding tree.

However, system workload may not be evenly distributed between cluster nodes. For example, when overall workload is high, one node can be heavily used, and thus may barely keep up with data reads and writes, which can cause a drop of throughput at the system level. At the same time, another node may experience relatively far less workload.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
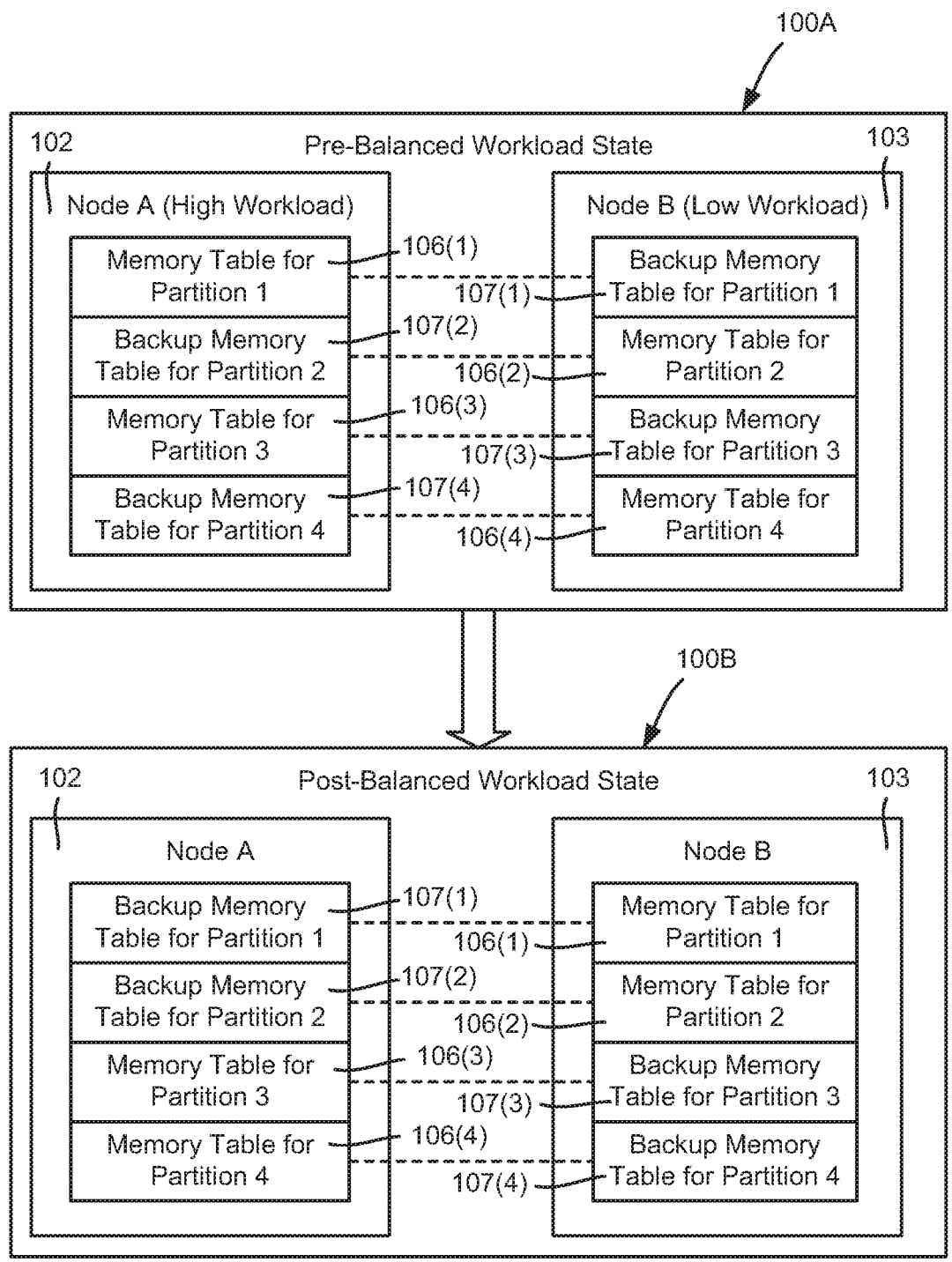
FIG. 1 is an example block diagram representation of balancing workload in a cluster of nodes by moving memory tables between nodes, in accordance with various aspects and implementations of the subject disclosure.

Various aspects of the technology described herein are generally directed towards workload balancing in a data storage system by redistributing the cluster nodes' metadata data structures. For example, in one ECS implementation, a directory table has a number of partitions (e.g., 128), configured as search trees, with the partitions distributed between the cluster nodes such that each partition is owned by a single node. As described herein, ownership of these partitions can be redistributed to balance workload.

For efficient access, the effective state of a partition (tree) is kept in a memory table in volatile memory of a cluster node, which can own more than one such partition. In ECS, the metadata data structures that can be redistributed thus comprise the memory tables that represent the partitions of a larger metadata structure, e.g., the directory table.

Because nodes can fail, a backup memory table, which is one implementation comprises a shallow memory table, is maintained at another node. As described herein, a shallow memory table normally needs far fewer system resources than the "primary" memory table that the shallow memory table backs up.

In one aspect described herein, consider that a first node, which maintains a primary memory table for a logical directory table partition, has a relatively high workload, and a second node, which maintains the backup memory table, has a relatively moderate/low workload. The technology described herein is directed towards switching between the primary and the backup memory tables such that the first node maintains the backup memory table for the partition and the second node maintains the primary memory table for the partition. Such a switch may result in more even workload distribution between the two nodes. Note that the switch between a primary memory table and its backup memory table can be relatively seamless, particularly when the backup memory table is a shallow memory table as described herein.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

As will be understood, the implementation(s) described herein are non-limiting examples, and variations to the technology can be implemented. For instance, examples are based on the ECS data storage system, however the technology described herein can be used by any data storage system that has multiple nodes and distributed data, e.g., distributed metadata. As such, any of the embodiments, aspects, concepts, structures, functionalities, implementations and/or examples described herein are non-limiting, and the technology may be used in various ways that provide benefits and advantages in data storage technology in general.

Aspects of the subject disclosure will now be described more fully hereinafter with reference to the accompanying drawings in which example components and operations are shown, and wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure. Thus, the subject disclosure may be embodied in many different forms and should not be construed as limited to the examples set forth herein.

FIG. 1 shows a data storage system in two states (over time), namely a pre-balanced workload state 100A and a post-balanced workload state 100B. In the example of FIG. 1, a node A labeled 102 and a node B labeled 103 are depicted in both states 101A and 100B. As represented in the example of FIG. 1, in the pre-balanced workload state 100A, the node A 102 has a relatively high workload, and the node B 103 has a relatively low workload.

More particularly, in the pre-balanced workload state 100A, the node A 102 in has a (primary) memory table 106(1) for a partition 1, which is backed up by a backup memory table 107(1) in the node B 103. As also shown, the node A 102 has a (primary) memory table 106(3) for a partition 3, which is backed up by a backup memory table 107(3) in the node B 103. The node B 103 in state 100A has a (primary) memory table 106(2) for a partition 2, which is backed up by a backup memory table 107(2) in the node A 102, and the node B 103 has a (primary) memory table 106(4) for a partition 4, which is backed up by a backup memory table 107(4) in the node A 102.

Consider that the node A 102 has a high workload and maintains the primary memory table 106(1) for a partition, and that the node B 103 has a moderate/low workload and maintains the backup memory table 107(1). More particularly, in the example of state 100A of FIG. 1, the node A 102 has a high workload because it maintains primary memory tables of two rather "hot" partitions 1 and 3, partitions that receive a relatively large number of updates. Conversely, the node B 103 at state 100A has a low workload because it maintains primary memory tables of two rather "cold" partitions 2 and 4, partitions that receive a relatively small number of updates. Each node maintains backup memory tables for the primary memory tables the other node maintains.

As described herein, it may be beneficial to switch between the primary and the backup memory tables so the node A 102 maintains the backup memory table 107(1) and the node B 103 maintains the primary memory table 106(1), as in the state 100B. Such a switch may result in more even workload distribution between the two nodes.

Further, so that the node B 103 does not own three partitions/memory tables while the node A 102 owns one, ownership of the partition 4 and corresponding memory table 106(4) are swapped with the backup memory table 107(4) between node A 102 and node B 103. The result is depicted in the post-balanced workload state 100B in the example of FIG. 1, where after workload balancing, the node A 102 in has the backup memory table 107(1) for a partition 1, which backs up the primary memory table 106(1) in the node B 103. As also shown, the node A 102 retains the primary memory table 106(3) for the partition 3, which is backed up by the backup memory table 107(3) in the node B 103. The node B 103 in state 100A retains the primary memory table 106(2) for the partition 2, which is backed up by the backup memory table 107(2) in the node A 102, and the node A 102 now has the primary memory table 106(4) for a partition 4, which is backed up by the backup memory table 107(4) in the node B 103.

Turning to aspects of shallow memory tables, in one or more implementations, the backup memory tables can be shallow memory tables, which do not cause a significant impact on a data storage system during normal operating conditions. The shallow memory table (in contrast to a shadow memory table, for example) does not directly back up a primary memory table, but rather contains significantly less data, namely the data needed to recreate the primary memory table, such as if the node that contains the primary memory table fails, or the primary memory table needs to be moved for workload redistribution as in FIG. 1.

In ECS, disk space is partitioned into a set of blocks of fixed size called chunks. The various types of data, including user data and various types of metadata, are stored in chunks. There are different types of chunks, one type per capacity user. In particular, user data is stored in repository chunks, while the metadata is stored in directory tables, where each directory table is a set of key-value search trees. These search trees are stored in tree chunks. Each search tree has a journal of updates, with tree journals stored in journal chunks.

Chunks of each type can be shared. For instance, one repository chunk may contain segments of several user objects, one tree chunk may contain elements of several trees, and so on.

In one or more implementations, each directory table comprises 128 trees (partitions). Each tree is owned by one cluster node, and there is a hash function that distributes trees of each directory table between the nodes. As described herein, redistribution logic can switch partition ownership based on workload balancing considerations.

ECS implements bulk tree updates in order to minimize the total cost of updates. As set forth above, a node that owns a tree/partition keeps an effective state of the tree (the state, which takes into account the tree's journal) in a volatile memory referred to as a memory table (also referred to herein as a memory table of full value). As can be understood, having a considerable part of a search tree in a memory table in fast volatile storage significantly speeds up access to metadata.

Memory tables in ECS are relatively large, comprising gigabytes of volatile memory. When the accumulated footprint of all memory tables owned by a node owns exceeds the amount of volatile memory reserved for them, the node dumps the memory tables to a non-volatile memory. Each memory table is dumped as a new version of the corresponding tree. Note that because of the large size of the memory tables, new tree versions are not created that often.

Figure 2:
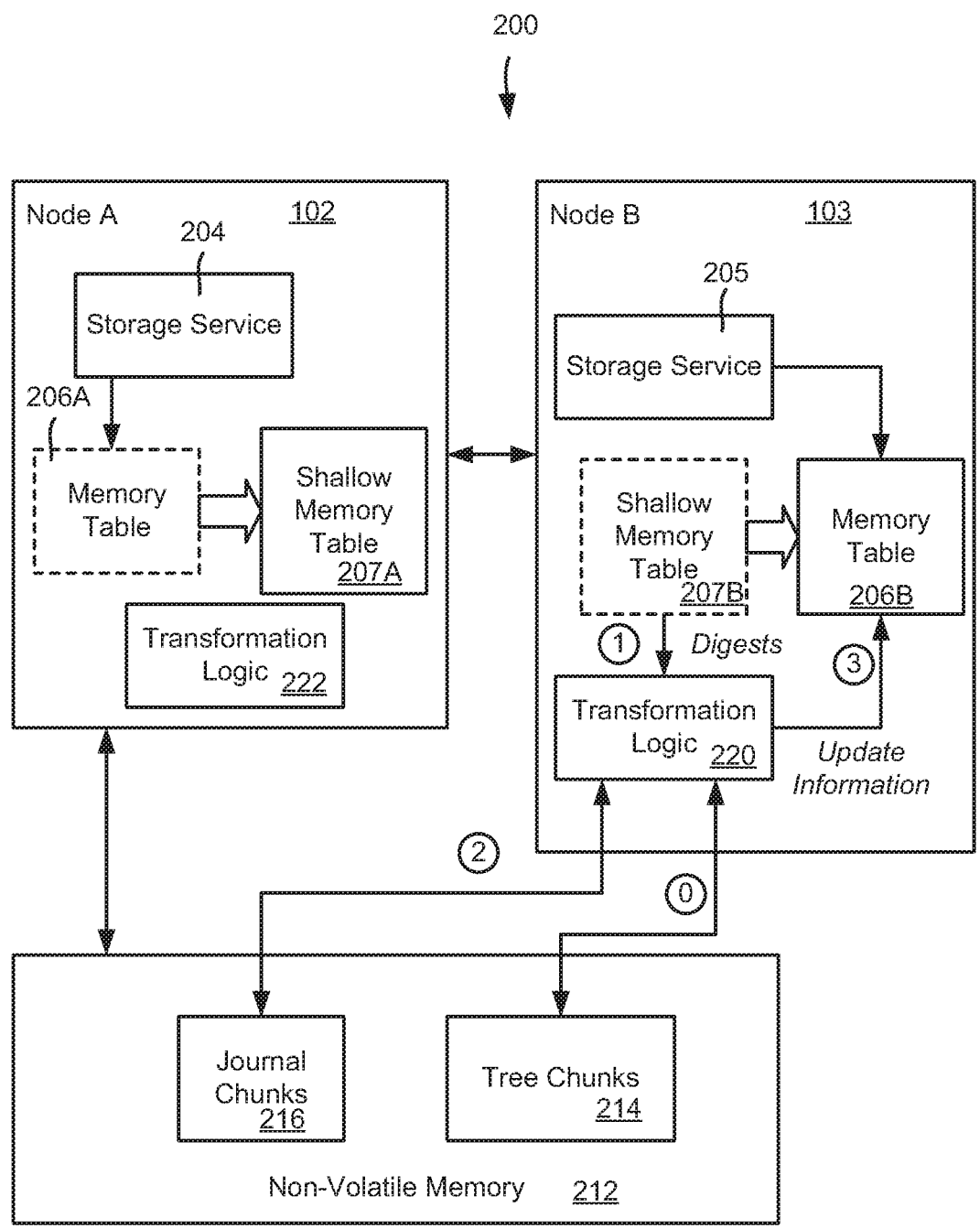
FIG. 2 is an example block diagram representation of moving a primary memory table and a backup memory table by transforming a backup (shallow) memory table into a primary memory table and transforming a primary memory table into a backup (shallow) memory table, in accordance with various aspects and implementations of the subject disclosure.

FIG. 2 shows part of a cloud data storage system 200 such as ECS in which two nodes are shown, the node A 102 and the node B 103 of FIG. 1. Among its services, a node such as the node 102 contains a storage service 204 that receives updates to entities (e.g., data objects) managed by the respective node 102. The node B 205 is also shown as having a storage service 108.

In a typical update operation, an entity update for an entity managed by the node A 102 (a main node for this entity) is handled by the storage service 204, which modifies a corresponding memory table 206A based on the update. As described herein, the memory table 206A corresponds to the current state of the search tree of entity metadata, including updates.

The storage service 204 also persists the update in nonvolatile memory 212. For efficiency, instead of modifying the search tree of metadata (maintained in tree chunks 214) based on the update, the update is journaled to a journal record (maintained in journal chunks 216); when needed, the search tree can be updated using the journal records to modify the tree into the actual current tree state.

As described herein, an entity update operation is further communicated (in part) to a backup node, which in the example of FIG. 2 is the node B 103. The node B 103 maintains a shallow memory table as described herein (block 207B, which includes a manager component that maintains the shallow memory table).

As described herein, the shallow memory table (block 207B) saves partial information regarding the update, with the partial information referred to as a digest. In general, a digest comprises a key-digest pair that contains the information needed to locate the journal record for the update, (e.g., journal chunk identifier plus offset for the relevant record) and is thus typically only a relatively very small amount of information relative to the full value maintained as a key-value pair in the memory table 206A. Note that to ensure a level of consistency between a main memory table 206A and its corresponding shallow memory table (block 207B), the digest can be associated with a sequence number via a sequence number device coupled to the storage service, and returned with an acknowledgement.

To summarize, the general content of shallow memory tables comprises a key-value map of digests of tree updates. A key corresponds to a tree key, digest value corresponds to a location of an update within journal chunks. Note that if there are multiple updates for a single key, a digest value can correspond to a list of updates.

A shallow memory table also keeps a tree root. Note that a shallow memory table does not get update digests and root updates from general sources of information like journals and shared cluster memory, but rather, the information for the shallow memory comes directly from a node that owns a tree. When another update comes to a node to handle, the node stores the update to journal, updates its local memory table and sends the digest for the update to the node that maintains shallow memory table for the tree. When a new version is created for the tree, the new root is also sent to the backup node. Upon receiving a new tree root, a shallow memory table clears its key-value map of update digests.

As described herein, when needed, a key-digest pair can be transformed to a key-value pair, as maintained in a memory table of full value. To this end, the digest is used to discover the complete description of the tree update (e.g. in the corresponding journal). Note however that in one or more implementations, a digest can further comprise information regarding the type of update (e.g., create/update/delete) that occurred. This additional information can be used to optimize user traffic handling during transformation of a shallow memory table to a memory table of a full value, as described herein.

More particularly, as represented in FIG. 2, the digest information can be used to transform (via transformation logic 220, which can be incorporated into or coupled to the storage service 205) a shallow memory table 207B (shown as a dashed block to represent a first state) to a normal memory table 206B (shown as a solid block to represent a second, transformed state). Moreover, as described herein, during transformation a shallow memory table can virtually immediately serve requests directed to a tree (albeit with some performance degradation).

As also represented in FIG. 2, a memory table 206A (shown as a dashed block to represent a first state) can be transformed into a shallow memory table 207A (shown as a solid block to represent a second, transformed state), referred to as deflation; (deflation generally refers to replacement of complete values in a primary memory table with digests, which typically results in a significant reduction of a memory table's memory footprint). For example, such as after a memory table is dumped to the non-volatile memory, partition ownership can be changed and the storage resources used for the former primary memory table can now be used for a shallow memory table 207A to start maintaining digests of updates to the (now-moved) primary memory table 206B. The transformation logic 220 provides a process in which the node 104 uses the tree root it has to get access to tree nodes and key-value pairs the tree contains, e.g., from the tree chunks 114 as represented in FIG. 2 via the arrow labeled zero (0). As represented by the arrows labeled one (1) to three (3), the transformation logic 220 iterates over the update digests that the shallow memory table contains, reads each update from the journal chunks 116, and replaces the digests with actual update information.

Figure 3:
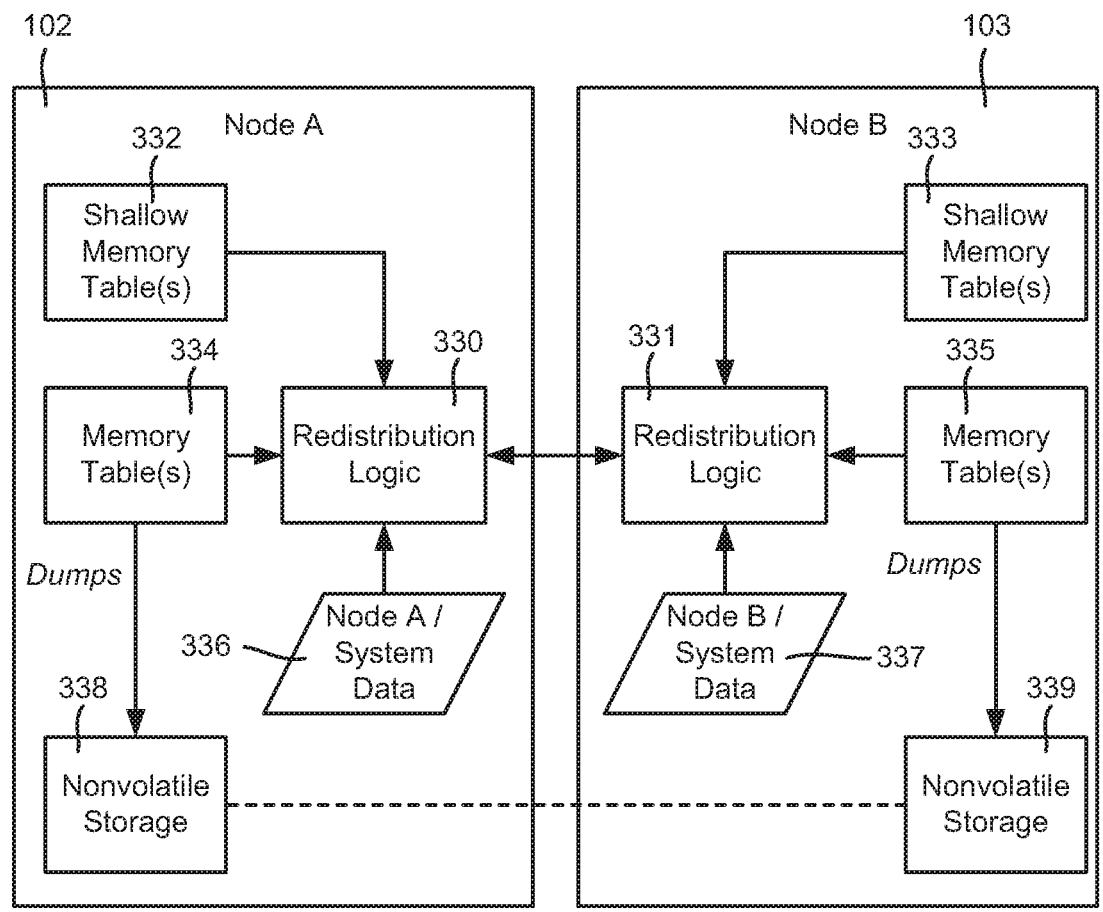
FIG. 3 is an example block diagram representing workload redistribution related-concepts with respect to shallow memory tables and primary memory tables, in accordance with various aspects and implementations of the subject disclosure.

Note that unlike a node failure, the switch that changes a primary memory table of one node to a shallow node and vice-versa on another node can be controlled, e.g., by redistribution logic 330 and 331 as shown in FIG. 3 (which may be coupled to or incorporated into the storage service running on each node). For example, the redistribution logic 330 can know or determine which shallow memory tables 332 reside on the node A as well as on other node(s), and similarly know which primary memory tables 334 reside on the node A as well as other node(s). The redistribution logic 330 also knows or can obtain information 336 of the memory footprint of each of the memory tables, the total memory footprint of memory tables, dumps to the nonvolatile storage 338, and so on. The redistribution logic 330 and 331 (as well as similar redistribution logic on any other node(s) can communicate, including to coordinate redistribution of the partitions and associated memory tables.

In this way, the switch can be performed in conjunction with the change of a shallow node to a primary memory table on another node. This facilitates a relatively seamless switching operation. For example, directly or shortly after a memory dump, the resources including memory used by the data structures to perform the switch are likely lower than at other times; (as set forth above, when a new version is created for a tree, the new root is also sent to the backup node, and a shallow memory table clears its key-value map of update digests). Thus a controlled switch can be performed at such a time.

In order to intelligently redistribute workload, there is a need to determine a given node's workloads and/or determine the usage ("temperature") of a logical partition (or partitions) with respect to updates. In one aspect, overall workload of a node may be assessed in a direct way (e.g., using CPU load stats) or indirect way (e.g., by measuring delays). These are only non-limiting examples of how a node's workload-related information can be measured.

To determine the workload produced by partition (directory table) management operations for purposes of leveling workloads based on partitions, a frequency of tree dumps may be used as a usage metric, also comprising workload-related information. The more frequent the tree dumps, the higher the workload produced by directory table management.

More particularly, knowing the usage (temperature) of a partition helps assure a desired load balancing effect, e.g., after a switch of primary and backup memory tables; (there is no point in switching memory tables for partitions that receive a low number of updates).

In one aspect, the temperature of a partition can be identified as a product of the two metrics, namely the frequency of tree dumps and the footprint of a primary memory table at the moment tree dumps starts. More particularly, a given node typically manages multiple partitions, and maintains a memory table per partition. There is a shared memory buffer reserved for the memory tables the node maintains (a cluster's node normally have buffers of the same size). At the moment a buffer becomes almost full, a memory dump starts for the trees with updates in their memory tables. For a given partition, the greater volume of updates, (sum of the sizes of the updates in a volatile memory, which is roughly a size of the memory table), the greater the partition's temperature.

By way of example, consider that at the moment the tree dumps start, the memory table for a partition X occupies a half of the buffer for all the memory tables, while memory table for a partition Y occupies a quarter of the buffer (the size of the buffer is typically gigabytes of RAM). If this occurs, partition X is two times hotter than partition Y, that is, X's memtable_share_in_bufffer is double that of Y's memtable_share_in_bufffer.

Further, the frequency (freq=number of tree dumps/time) of updates depends on the intensity of traffic, whereby the frequency can be measured as the number of updates per second. For example, consider that node A performs tree dumps every minute (freq=1/60) and at the moment the tree dumps start, the memory table for partition X normally occupies a half of the buffer for all the memory tables. Node B performs tree dumps every two minutes (freq=1/120) and at the moment the tree dumps start, the memory table for partition Y also occupies half of the buffer. Despite the fact two partitions have the same value for their share in the buffer, partition X is two times hotter than partition Y because it needs two times less time to fill a half of its respective buffer.

When the buffer size is a cluster-wide constant, the equation below can be used to determine the temperature as workload-related information (a usage metric) of a partition:

Temperature=memtable_share_in_bufffer*freq_of_tree_dumps

In the event that buffer size is not a cluster-wide constant, another equation can be used, (e.g., Temperature=memtable_size*freq) and so on.

Turning to another aspect, a controlled switch can involve more than two nodes. For example, consider that in FIG. 4 the nodes A 442 and B 443 have high workload, such that switching partition ownership between the nodes A 442 and B 443 would provide little benefit with respect to workload redistribution. However, a node C 444 is detected as having little workload, such as if newly added to a cluster, or because one or more of its memory tables is otherwise "cold" with respect to updates.

Figure 4:
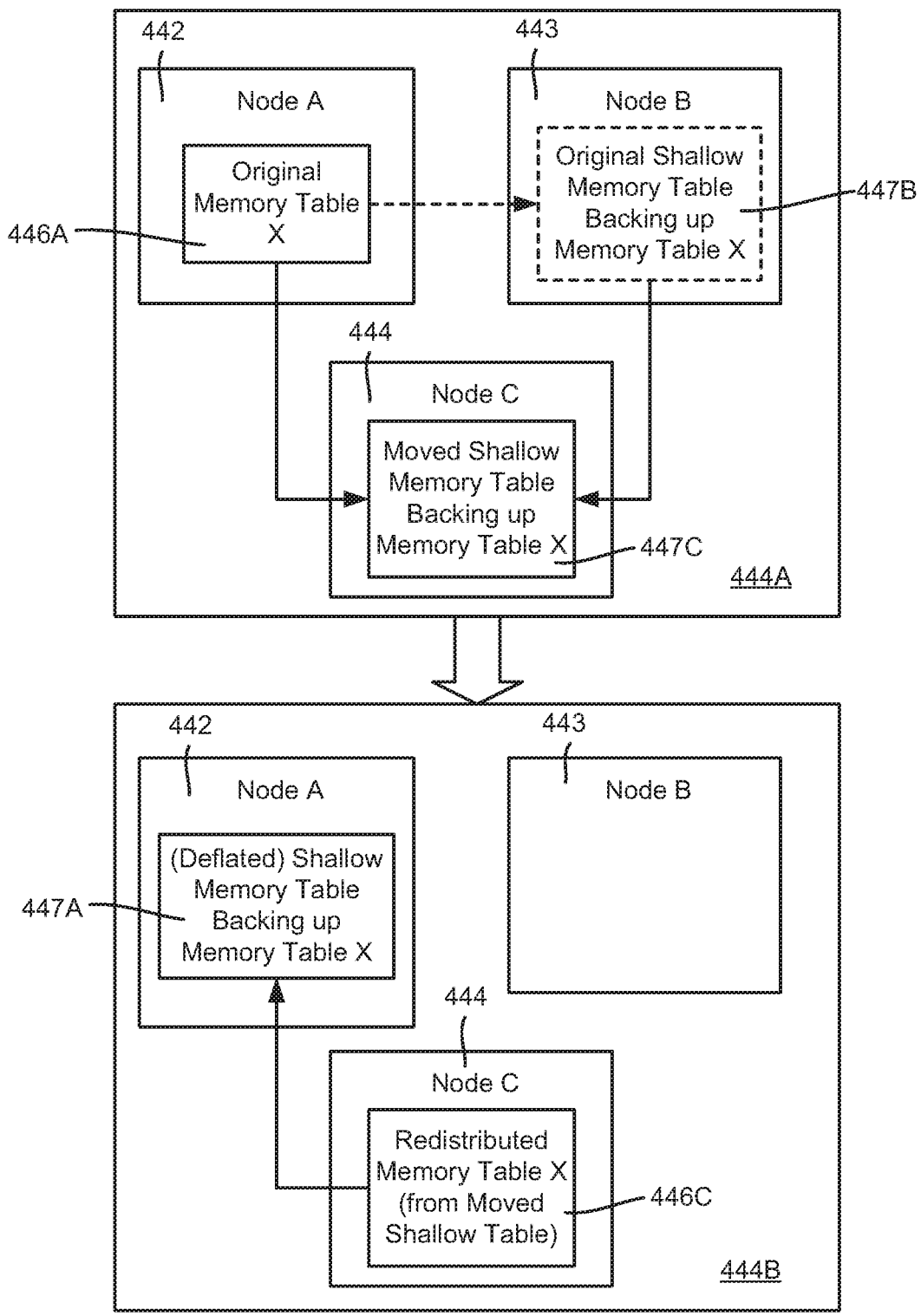
FIG. 4 is an example block diagram representing workload redistribution from a first node and a third node based on moving a shallow memory table from a second node to the third node before switching partition ownership to the third node, in accordance with various aspects and implementations of the subject disclosure.

In FIG. 4, block 400A, the shallow memory table 447B on the node B 443 that backs up the primary memory table 446A can be logically and physically moved to the node C 444, such as just after the shallow memory table clears its key-value map of update digests following a memory dump of the primary memory table. Once moved, the switch that changes the primary memory table 446A on the node A to a shallow memory table 447A in conjunction with the change of the shallow memory table 447C on the node C 444 to a primary memory table 446C can be accomplished (block 400B) as described above with reference to FIGS. 1-3. Note that although not explicitly shown, further partition/shallow memory table rearrangement can be performed as needed so that each node owns approximately the same number of partitions during non-switching operating states.

Figure 5:
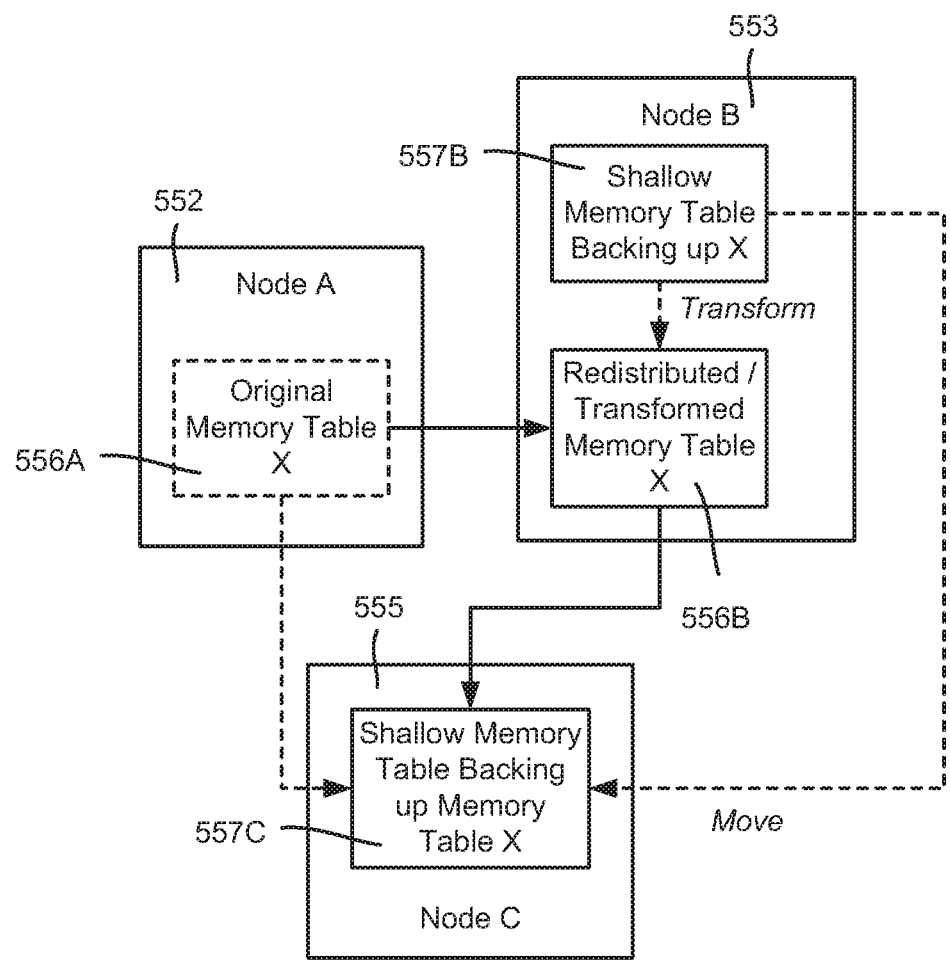
FIG. 5 is an example block diagram representing workload redistribution based on moving a primary memory table and a backup memory table, in accordance with various aspects and implementations of the subject disclosure.

As shown in FIG. 5, it is also feasible to "move" a primary memory table X 556A, such as from a node A 552 to a node B 553, with relatively little data transfer. For example, consider that the node B 553 has the shallow memory table 557B backing up the primary memory table X 556A on node A. A simulated, controlled failure of the node A 552 (which can be constrained to a simulated failure of only the primary table X 556A) results in the shallow memory table 557B being transformed to the primary memory table X 556B on the node B, and a new shallow memory table 557C being created on another node C 555 to back up the transformed/redistributed primary memory table 556B. In this way, for example, the node A 552A can be taken offline in a controlled way for maintenance or the like, or based on a perceived need (via statistics or the like) for a redistribution.

Figure 6:
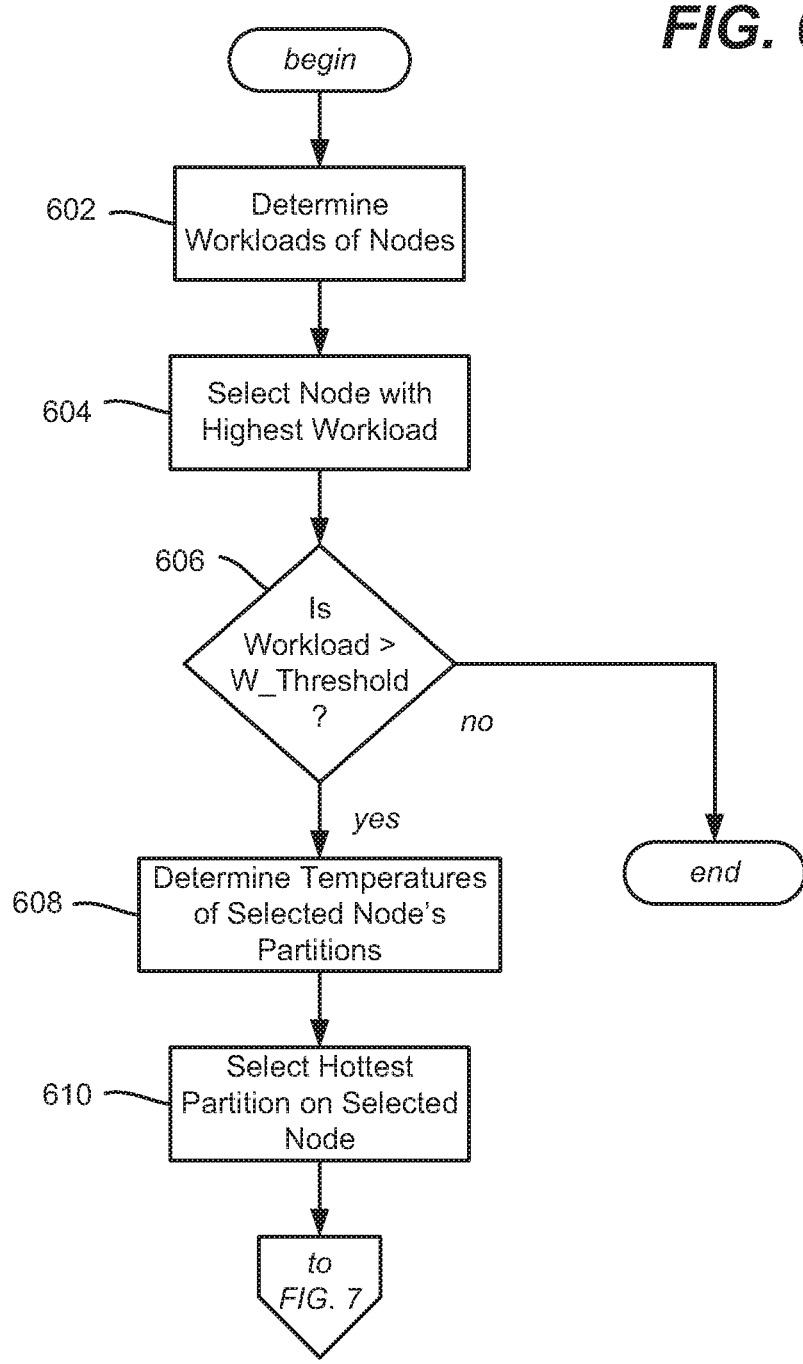
FIGS. 6 and 7 comprise a flow diagram showing example operations of switching one or more partitions based on workload-related information, in accordance with various aspects and implementations of the subject disclosure.

FIG. 6 represents the switching of primary partitions between two nodes to balance workloads by operating to better level out the nodes' total temperatures. Note that one node has a primary memory table and the other node has the backup memory table for that primary memory table. FIG. 6 assumes that there are a sufficient number of partitions per node (e.g., a sixteen node cluster has eight partitions managed per node) that by random distribution, when there is a relatively hot partition on one node, there is a relatively cold partition on the other node for which switching is worthwhile. Note that in the event this is not the situation, then moving shallow memory tables around (as in FIG. 4) can be performed.

In the example of FIG. 6, the node with the highest workload can be selected via operations 602 and 604, and if above some workload threshold value (W_Threshold) at operation 606, that node can be further considered for partition switching. Note that the threshold evaluation at operation 606 can be used to avoid the overhead of partition switching when no cluster node is experiencing a significant workload. Note however that redistribution as described herein is not limited to current and/or very recent workload-related data; instead, for example, redistribution as described herein can be based on statistics obtained during heavy cluster usage, and deferred to a time (e.g., a night or weekend) of light cluster usage.

Once selected, operation 608 obtains the partition's usage metric, e.g., the temperature of each partition as described above. Note that the temperatures are measured over time, can be averaged over time, and so forth, but also can be obtained once a node is selected for possible partition switching. At operation 610 the hottest partition (based on primary memory table usage as described above) is selected. The example process continues to FIG. 7.

Figure 7:
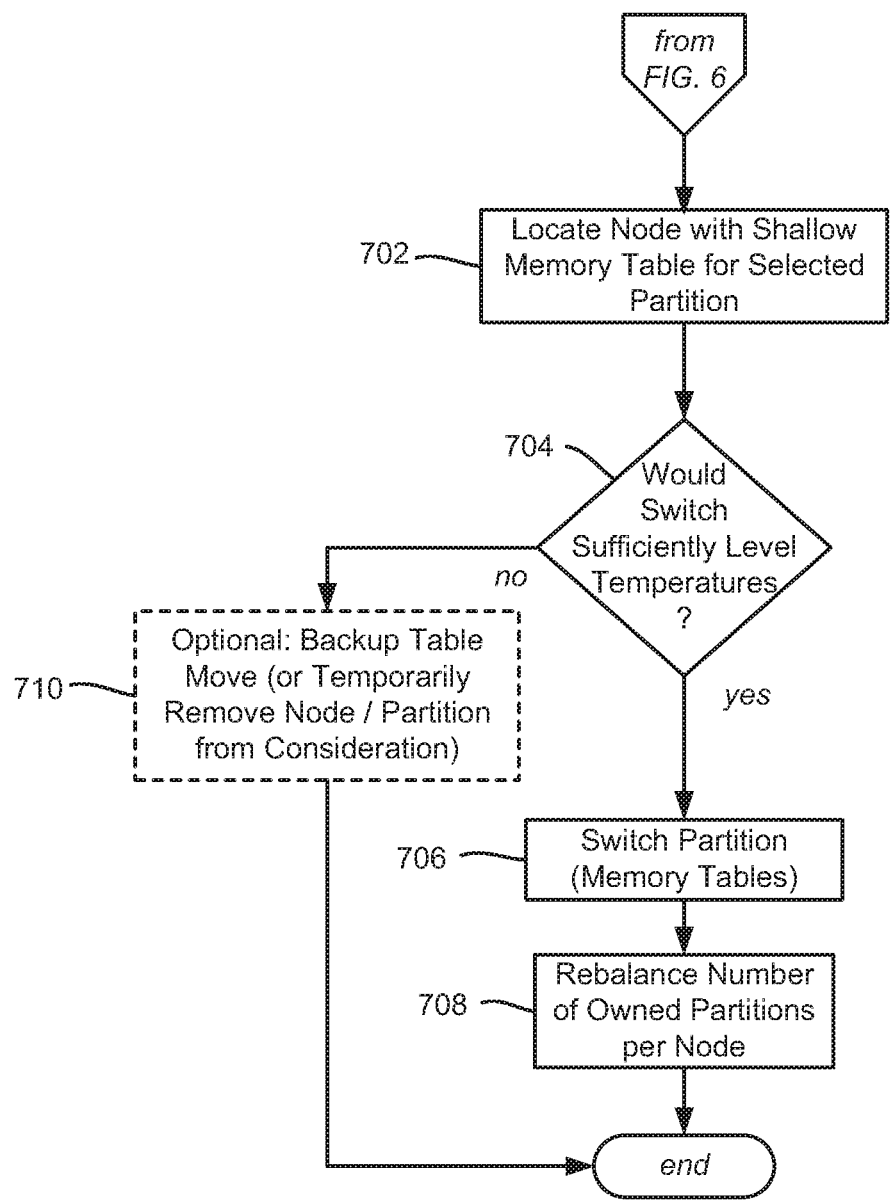

Operation 702 of FIG. 7 locates the counterpart node (the node owning the backup table) to that hottest partition. Operation 704 evaluates whether the switch, if made, would sufficiently level the total temperatures of the two nodes; this can avoid switching when the node with the highest workload/hottest partition and its counterpart node are already relatively level with respect to total temperatures of their respective partitions. If the temperatures are to become sufficiently level, the switch is made, that is, the primary memory table on the selected node now becomes the backup memory table and the backup memory table on the counterpart node now becomes the primary memory table. Note that the switch can be deferred until just after a memory dump as described herein.

At this point, the counterpart node now owns one more partition and the selected (formerly highest-workload) node owns one less. Operation 708 (which can be optional to an extent) operates to rebalance the number of owned partitions per node. In a situation in which the selected node has a different backup memory table (not the one just switched) to another primary memory table on the counterpart node (as in FIG. 1, for example), then the rebalancing can be a straightforward switch. If multiple (other) backup memory tables on the selected node to primary memory tables on the counterpart node exist, then the partition to switch for rebalancing partition ownership can be selected based on the respective temperatures after the first switch.

In the event that the selected node does not have another backup memory table with respect to the counterpart node that increased its number of owned partitions, then movement of backup table(s) as in FIG. 4 can be performed as part of operation 708 to facilitate the rebalancing. Note that In some scenarios, such as when there is not an exact distribution of partitions (e.g., the nodes in a ten-node cluster typically own twelve or thirteen nodes) the rebalancing of operation 708 may not be needed, e.g., if a node owning twelve partitions now owns thirteen following a switch, and the node that owned thirteen now owns twelve.

Returning to operation 704, consider that a switching of the hottest partition would not sufficiently level the temperatures, e.g., because the partitions of the selected node and the counterpart node that can be exchanged via switching are both relatively hot. In such a scenario, operation 710 can move one or more backup tables as in FIG. 4 to set up a partition switch to a different node, e.g., one that is generally colder. Another option is to temporarily remove the node or the partition from consideration and re-run the operations of FIGS. 6 and 7, so that a different node pair/partition can be switched.

It should be noted that at least some of the operations of FIGS. 6 and 7 can be rerun over any practical number of iterations. In this way, for example, if a switch lowers one node's workload, another high workload node/hot partition can be switched as described herein and so on to provide an overall node cluster with relatively balanced workloads and level partition/primary memory table temperatures across the nodes.

Figure 8:
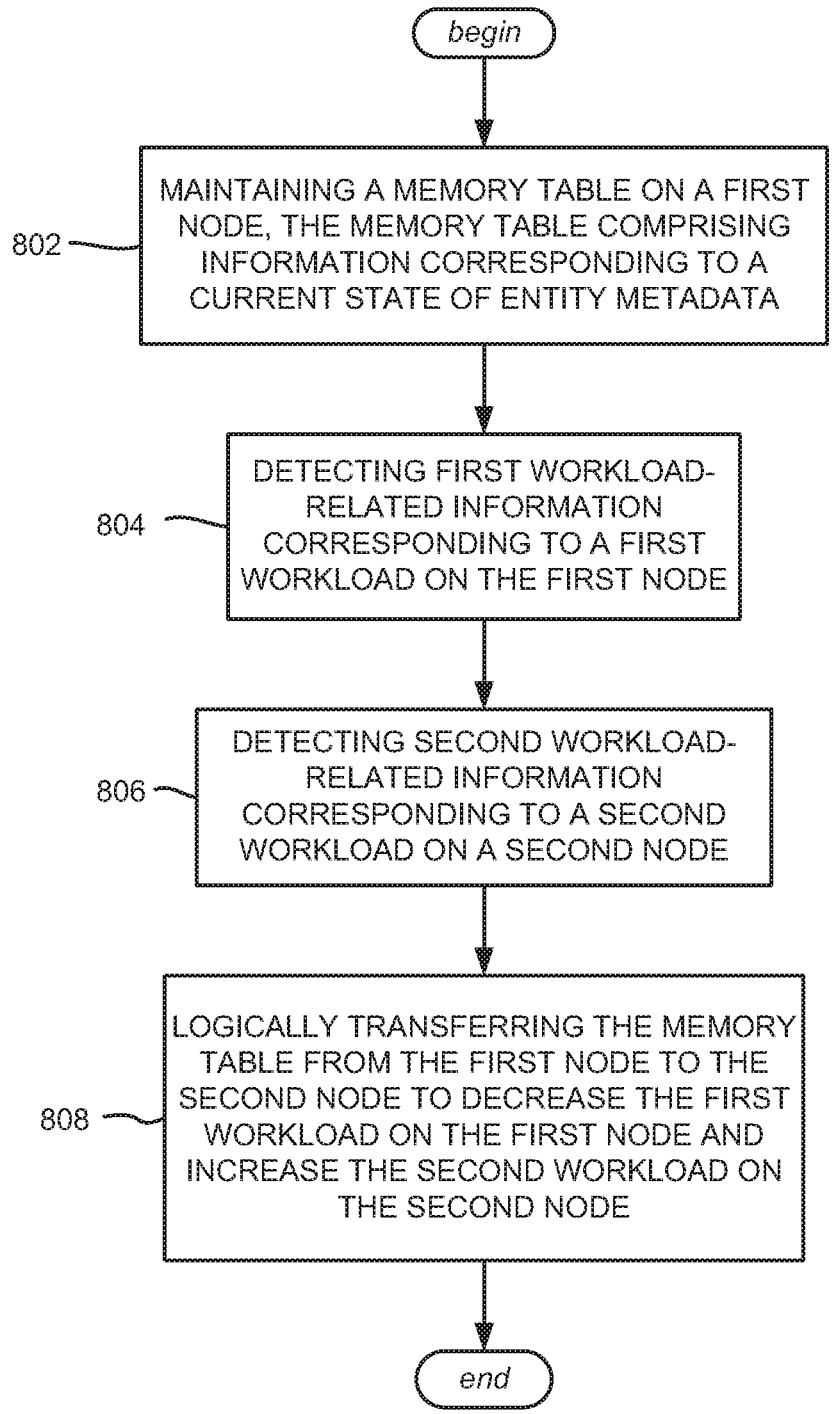
FIG. 8 is an example diagram of operations related to transferring an entity metadata data between nodes to balance node workload, in accordance with various aspects and implementations of the subject disclosure.

One or more aspects are represented in FIG. 8, such as of a system comprising a processor, and a memory that stores executable instructions that, when executed by the processor, facilitate performance of operations. Operation 802 represents maintaining a memory table on a first node, the memory table comprising information corresponding to a current state of entity metadata. Operation 804 represents detecting first workload-related information corresponding to a first workload on the first node. Operation 806 represents detecting second workload-related information corresponding to a second workload on a second node. Operation 808 represents logically transferring the memory table from the first node to the second node to decrease the first workload on the first node and increase the second workload on the second node.

The second node can maintain a shallow memory table that backs up the memory table; logically transferring the memory table from the first node to the second node can comprise processing the shallow memory table into an instance of the memory table on the second node, and further operations can comprise processing the memory table on the first node into an instance of the shallow memory table on the first node that backs up the instance of the memory table on the second node.

The entity metadata can comprise a tree of entity metadata, and the second node can maintain a shallow memory table comprising tree identification information that identifies the tree of entity metadata and digests comprising second information corresponding to locations of records in a journal of the records; the locations can correspond to entity updates applicable to the tree of entity metadata, and logically transferring the memory table from the first node to the second node can comprise processing the shallow memory table into an instance of the memory table on the second node.

The entity metadata can comprise a tree of entity metadata, and the second node can maintain a shallow memory table comprising tree identification information that identifies the tree of entity metadata and digests comprising second information corresponding to locations of records in a journal of the records; the locations can correspond to entity updates applicable to the tree of entity metadata, and further operations can comprise logically transferring the shallow memory table from the second node to the first node. Logically transferring the shallow memory table from the second node to the first node can comprise deflating the memory table on the first node into an instance of the shallow memory table on the first node.

Detecting the first workload-related information can comprise determining a usage metric based on a size of the memory table on the first node relative to a memory table buffer size of the first load and a frequency of buffer dumps from the buffer to a nonvolatile storage.

Detecting the first workload-related information can comprise determining a usage metric based on a size of the memory table and a frequency of dumps of the memory table to a nonvolatile storage. Detecting the first workload-related information can comprise determining load statistics for a central processing unit. Detecting the first workload-related information can comprise measuring delay information.

Further operations can comprise maintaining a shallow memory table on a third node, wherein the shallow memory table backs up the memory table, and wherein the logically transferring the memory table from the first node to the second node further comprises communicating information to the second node that indicates that the shallow memory table is maintained on the third node.

Figure 9:
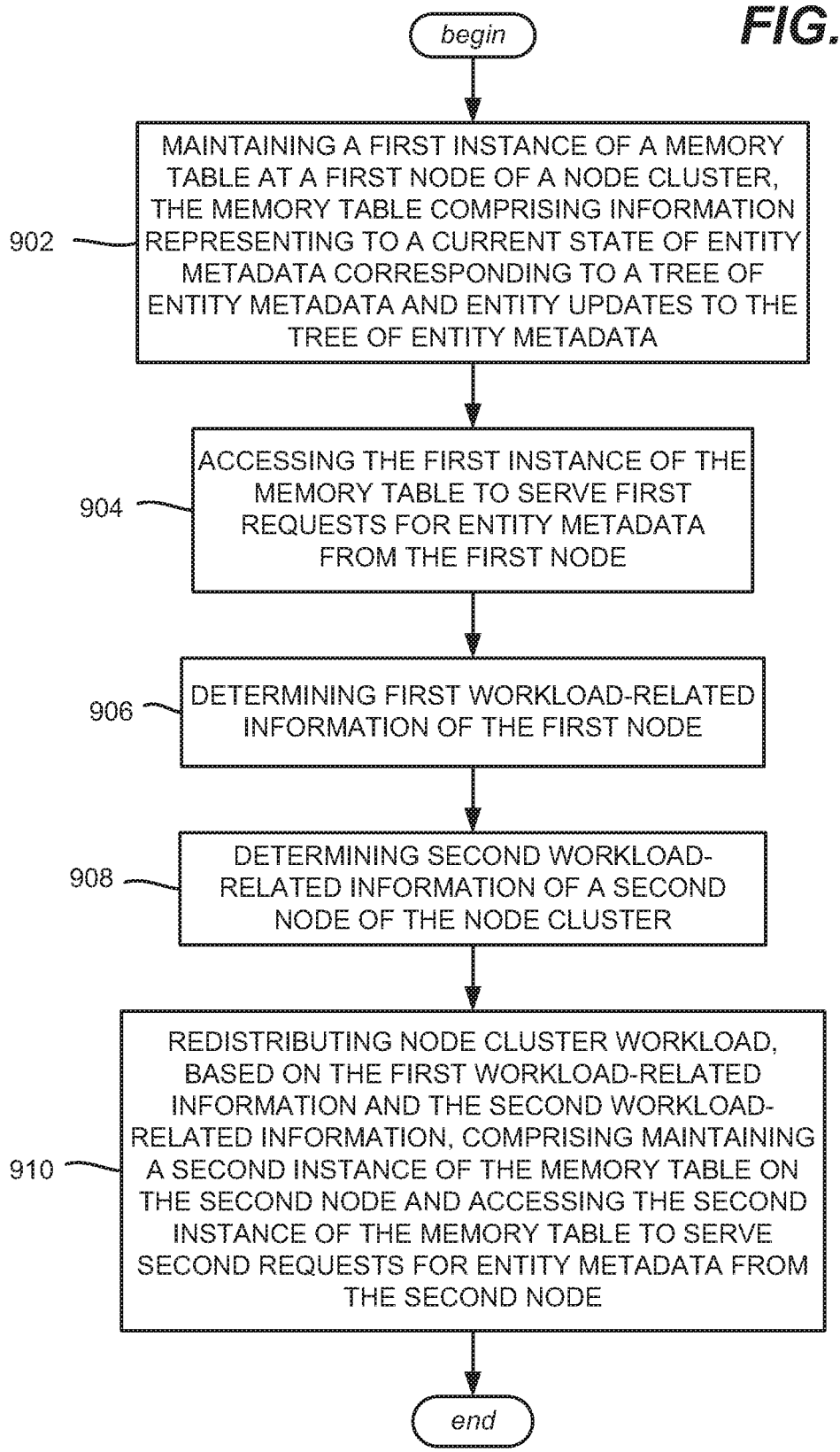
FIG. 9 is an example diagram of operations related to redistributing node cluster workload via memory table redistribution based on workload-related information, in accordance with various aspects and implementations of the subject disclosure.

One or more aspects are represented in FIG. 9, such as of a system comprising a processor, and a memory that stores executable instructions that, when executed by the processor, facilitate performance of operations. Operation 902 represents maintaining a first instance of a memory table at a first node of a node cluster, the memory table comprising information representing to a current state of entity metadata corresponding to a tree of entity metadata and entity updates to the tree of entity metadata. Operation 904 represents accessing the first instance of the memory table to serve first requests for entity metadata from the first node. Operation 906 represents determining first workload-related information of the first node. Operation 908 represents determining second workload-related information of a second node of the node cluster. Operation 910 represents redistributing node cluster workload, based on the first workload-related information and the second workload-related information, comprising maintaining a second instance of the memory table on the second node and accessing the second instance of the memory table to serve second requests for entity metadata from the second node.

The second node can maintain a shallow memory table that backs up the first instance of the memory table on the first node, and redistributing the node cluster workload can comprise processing the shallow memory table into the second instance of the memory table on the second node.

Further operations can comprise maintaining an instance of the shallow memory table on the first node that backs up the second instance of the memory table on the second node.

Determining the first workload-related information of the first node can comprise determining a first usage value based on a frequency of first memory table dumps on the first node, and determining the second workload-related information of the second node can comprise determining a second usage value based on a frequency of second memory table dumps on the second node.

Determining the first workload-related information of the first node can comprise determining a first usage value based on a first memory size footprint of the first memory table.

Figure 10:
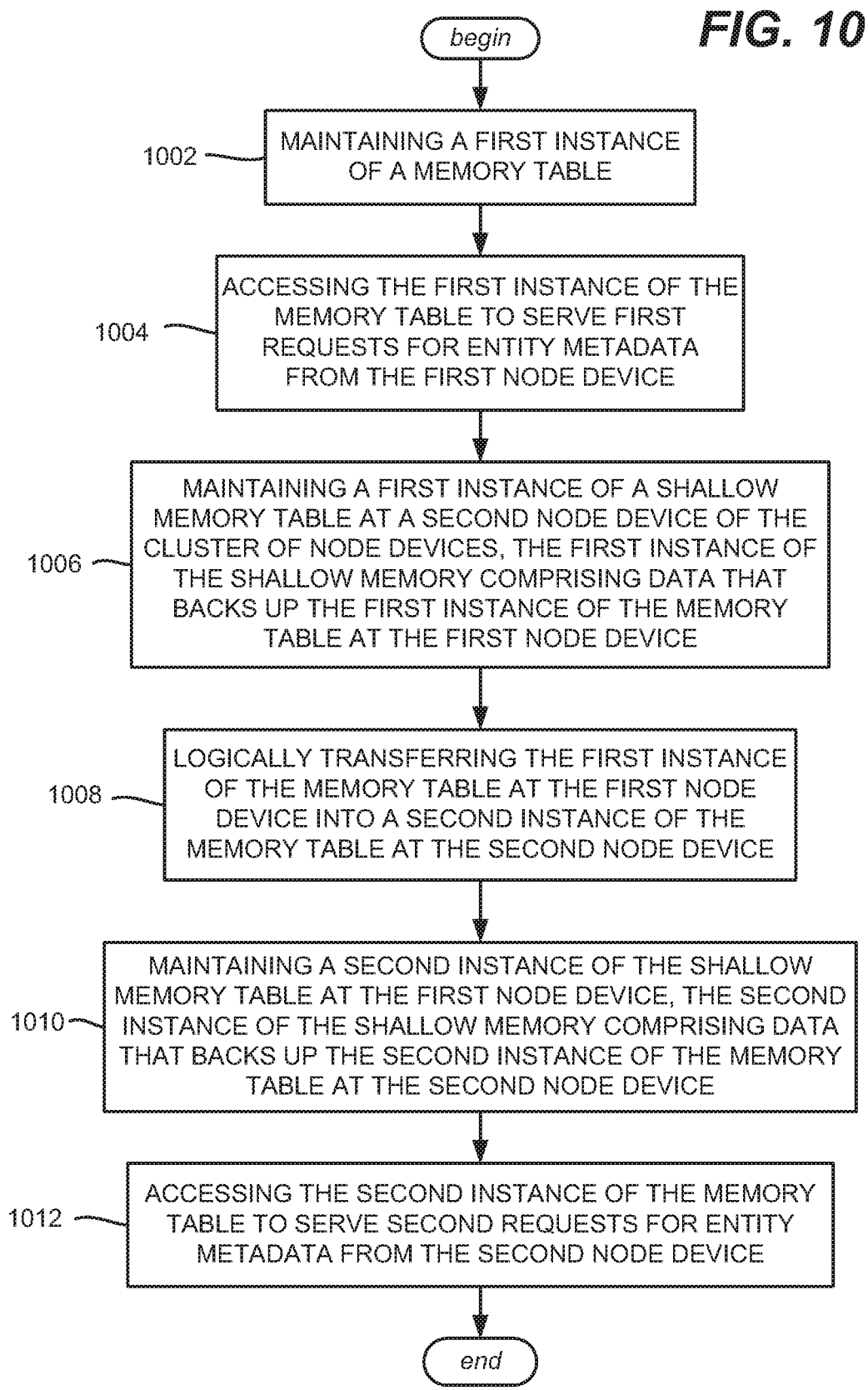
FIG. 10 is a flow diagram showing example operations related to logically transferring a memory table from a first node to a second node and maintaining a backup memory table for that transferred memory table at the first node, in accordance with various aspects and implementations of the subject disclosure.

One or more aspects, such as implemented in a machine-readable storage medium, comprising executable instructions that, when executed by a processor of a first node device of a cluster of node devices, facilitate performance of operations, can be directed towards operations exemplified in FIG. 10. Example operation 1002 represents maintaining a first instance of a memory table. Example operation 1004 represents accessing the first instance of the memory table to serve first requests for entity metadata from the first node device. Example operation 1006 represents maintaining a first instance of a shallow memory table at a second node device of the cluster of node devices, the first instance of the shallow memory comprising data that backs up the first instance of the memory table at the first node device. Example operation 1008 represents logically transferring the first instance of the memory table at the first node device into a second instance of the memory table at the second node device. Example operation 1010 represents maintaining a second instance of the shallow memory table at the first node device, the second instance of the shallow memory comprising data that backs up the second instance of the memory table at the second node device. Example operation 1012 represents accessing the second instance of the memory table to serve second requests for entity metadata from the second node device.

Logically transferring the first instance of the memory table at the first node device into the second instance of the memory table at the second node device can comprise processing the shallow memory table at the second node device into the second instance of the memory table at the second node device.

Maintaining the second instance of the shallow memory table at the first node device can comprise logically transferring the first instance of the shallow memory table at the second node device into the second instance of the shallow memory table at the first node device.

Logically transferring the first instance of the shallow memory table at the second node device into the second instance of the shallow memory table at the first node device can comprise processing the first instance of the memory table on the first node device into the second instance of the shallow memory table on the first node device.

Logically transferring the first instance of the memory table at the first node device into the second instance of the memory table at the second node device can occur in response to determining first workload-related information of the first node device and determining second workload-related information of the second node device.

As can be seen, described herein is a technology that facilitates high and efficient data availability by providing a healthy workload balance between cluster nodes. The technology is practical to implement, as in one or more implementations, as relatively seamless transferring of a primary memory table and a backup memory table is available.

Figure 11:
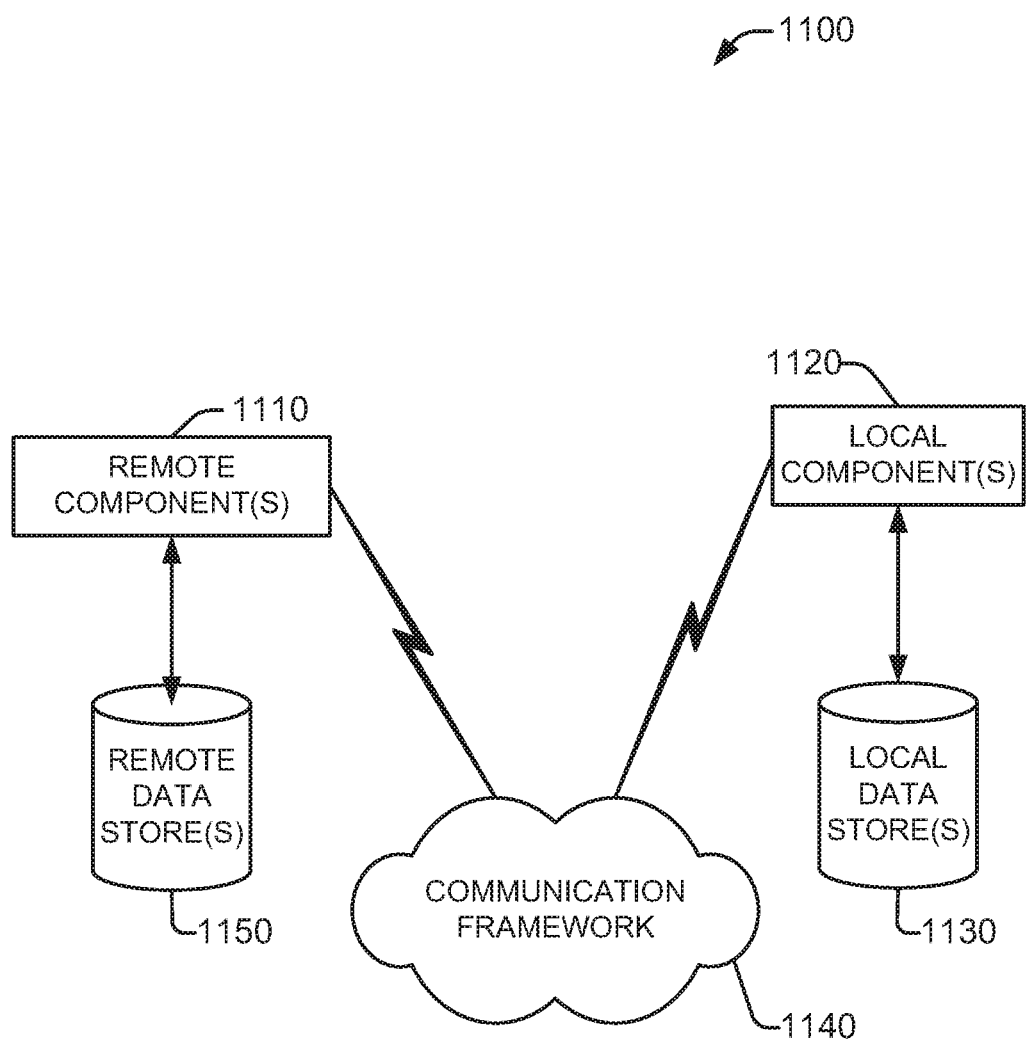
FIG. 11 depicts an example schematic block diagram of a computing environment with which the disclosed subject matter can interact.

FIG. 11 is a schematic block diagram of a computing environment 1100 with which the disclosed subject matter can interact. The system 1100 comprises one or more remote component(s) 1110. The remote component(s) 1110 can be hardware and/or software (e.g., threads, processes, computing devices). In some embodiments, remote component(s) 1110 can be a distributed computer system, connected to a local automatic scaling component and/or programs that use the resources of a distributed computer system, via communication framework 1140. Communication framework 1140 can comprise wired network devices, wireless network devices, mobile devices, wearable devices, radio access network devices, gateway devices, femtocell devices, servers, etc.

The system 1100 also comprises one or more local component(s) 1120. The local component(s) 1120 can be hardware and/or software (e.g., threads, processes, computing devices). In some embodiments, local component(s) 1120 can comprise an automatic scaling component and/or programs that communicate/use the remote resources 1110 and 1120, etc., connected to a remotely located distributed computing system via communication framework 1140.

One possible communication between a remote component(s) 1110 and a local component(s) 1120 can be in the form of a data packet adapted to be transmitted between two or more computer processes. Another possible communication between a remote component(s) 1110 and a local component(s) 1120 can be in the form of circuit-switched data adapted to be transmitted between two or more computer processes in radio time slots. The system 1100 comprises a communication framework 1140 that can be employed to facilitate communications between the remote component(s) 1110 and the local component(s) 1120, and can comprise an air interface, e.g., Uu interface of a UMTS network, via a long-term evolution (LTE) network, etc. Remote component(s) 1110 can be operably connected to one or more remote data store(s) 1150, such as a hard drive, solid state drive, SIM card, device memory, etc., that can be employed to store information on the remote component(s) 1110 side of communication framework 1140. Similarly, local component(s) 1120 can be operably connected to one or more local data store(s) 1130, that can be employed to store information on the local component(s) 1120 side of communication framework 1140.

Figure 12:
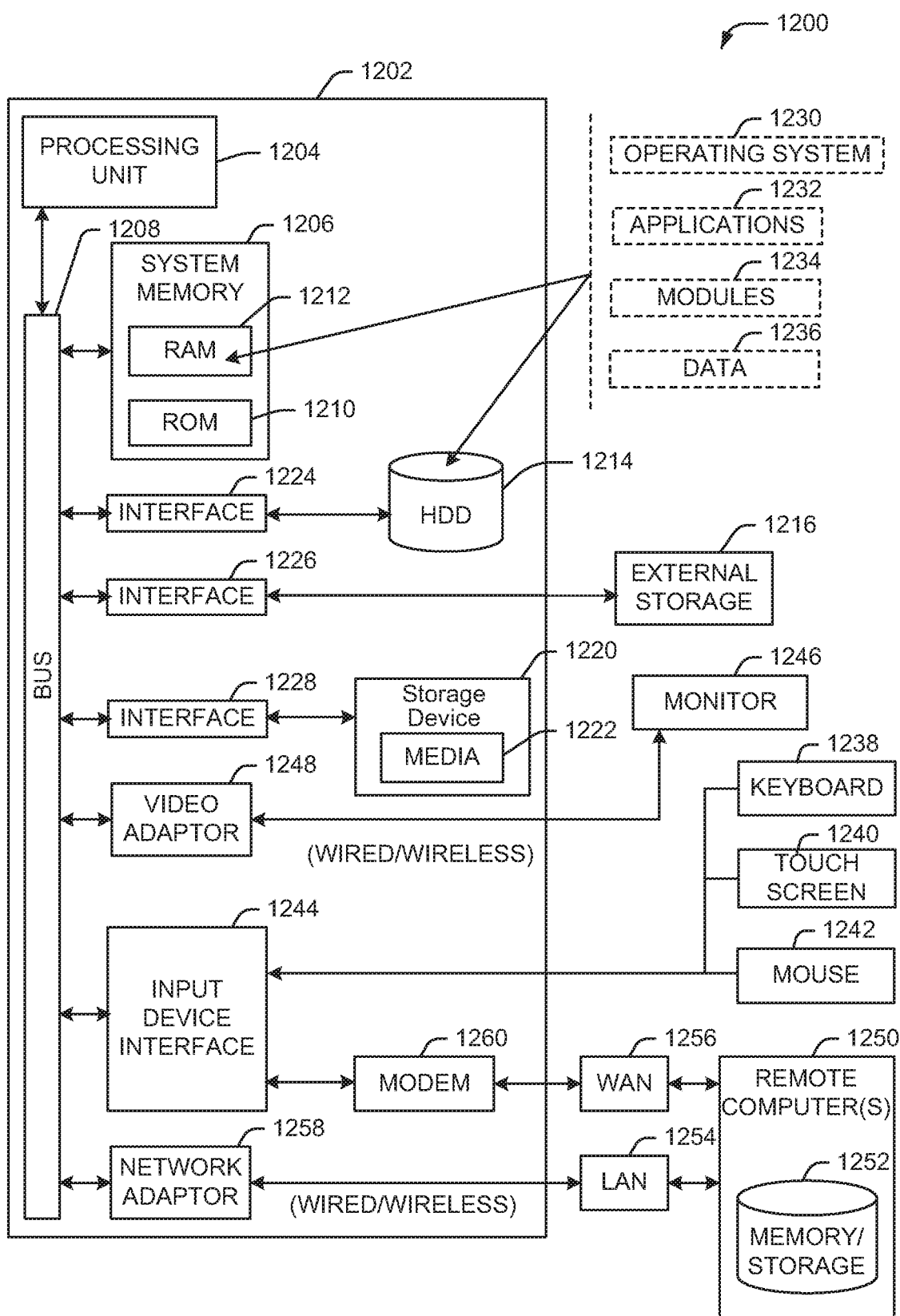
FIG. 12 illustrates an example block diagram of a computing system operable to execute the disclosed systems and methods in accordance with various aspects and implementations of the subject disclosure.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), and can include one or more external storage devices 1216 (e.g., a magnetic floppy disk drive (FDD) 1216, a memory stick or flash drive reader, a memory card reader, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214.

Other internal or external storage can include at least one other storage device 1220 with storage media 1222 (e.g., a solid state storage device, a nonvolatile memory device, and/or an optical disk drive that can read or write from removable media such as a CD-ROM disc, a DVD, a BD, etc.). The external storage 1216 can be facilitated by a network virtual machine. The HDD 1214, external storage device(s) 1216 and storage device (e.g., drive) 1220 can be connected to the system bus 1208 by an HDD interface 1224, an external storage interface 1226 and a drive interface 1228, respectively.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather is to be construed in breadth, spirit and scope in accordance with the appended claims.

What is claimed is:

1. A system, comprising:
   a processor, and
   a memory that stores executable instructions that, when executed by the processor, facilitate performance of operations, the operations comprising:
   maintaining a memory table on a first node, the memory table comprising information corresponding to a current state of entity metadata;
   maintaining a shallow memory table on a second node, the shallow memory table comprising a backup of the memory table in a reduced size relative to the memory table;
   in response to determining that a first load value of a first workload on the first node is greater than a second load value of a second workload on the second node, logically transferring the memory table from the first node to the second node, the logically transferring comprising processing the memory table on the first node into an instance of the shallow memory table independent of transferring the shallow memory table from the second node to the first node, and the logically transferring comprising processing the shallow memory table on the second node into an instance of the memory table independent of transferring the memory table from the first node to the second node.

2. The system of claim 1, wherein the entity metadata comprises a tree of entity metadata, and wherein the shallow memory table comprises tree identification information that identifies the tree of entity metadata and digests comprising second information corresponding to locations of records in a journal of the records, and wherein the locations correspond to entity updates applicable to the tree of entity metadata.

3. The system of claim 1, wherein the entity metadata comprises a tree of entity metadata, wherein the shallow memory table comprises tree identification information that identifies the tree of entity metadata and digests comprising second information corresponding to locations of records in a journal of the records, and wherein the locations correspond to entity updates applicable to the tree of entity metadata.

4. The system of claim 3, wherein the logically transferring comprises:
deflating the memory table on the first node into the instance of the shallow memory table on the first node.

5. The system of claim 1, wherein the operations further comprise:
determining the first workload based on a size of the memory table on the first node relative to a memory table buffer size of the first workload and a frequency of buffer dumps from a buffer to a nonvolatile storage.

6. The system of claim 1, wherein the operations further comprise:
determining the first workload based on a size of the memory table and a frequency of dumps of the memory table to a nonvolatile storage.

7. The system of claim 1, wherein the operations further comprise:
determining the first workload based on load statistics for a central processing unit.

8. The system of claim 1, wherein the operations further comprise:
determining the first workload based on measured delay information.

9. The system of claim 1, wherein the operations further comprise:
maintaining a second shallow memory table on a third node, wherein the second shallow memory table backs up the memory table, and wherein the logically transferring the memory table from the first node to the second node further comprises communicating information to the second node that indicates that the second shallow memory table is maintained on the third node.

10. A system, comprising:
a processor, and
a memory that stores executable instructions that, when executed by the processor, facilitate performance of operations, the operations comprising:
maintaining a first instance of a memory table at a first node of a node cluster, the memory table comprising information representing to a current state of entity metadata;
maintaining a shallow memory table on a second node of the node cluster, the shallow memory table comprising a backup of the memory table in a reduced size relative to the memory table;
accessing the first instance of the memory table to serve first requests for entity metadata from the first node;
determining first workload-related information of the first node;
determining second workload-related information of a second node of the node cluster; and
redistributing node cluster workload, based on the first workload-related information and the second workload-related information, comprising maintaining transforming the shallow memory table into a second instance of the memory table on the second node and accessing the second instance of the memory table to serve second requests for entity metadata from the second node, the transforming being performed independently of transferring the first instance of the memory table from the first node to the second node.

11. The system of claim 10, wherein the determining the first workload-related information of the first node comprises:
determining a first usage value based on a frequency of first memory table dumps on the first node, and wherein the determining the second workload-related information of the second node comprises determining a second usage value based on a frequency of second memory table dumps on the second node.

12. The system of claim 10, wherein the determining the first workload-related information of the first node comprises:
determining a first usage value based on a first memory size footprint of the memory table.

13. The system of claim 10, wherein the entity metadata comprises a tree of entity metadata, wherein the shallow memory table comprises tree identification information that identifies the tree of entity metadata and digests comprising second information corresponding to locations of records in a journal of the records, and wherein the locations correspond to entity updates applicable to the tree of entity metadata.

14. The system of claim 10, wherein the entity metadata comprises a tree of entity metadata, wherein the shallow memory table comprises tree identification information that identifies the tree of entity metadata and digests comprising second information corresponding to locations of records in a journal of the records, and wherein the locations correspond to entity updates applicable to the tree of entity metadata.

15. A non-transitory machine-readable medium, comprising executable instructions that, when executed by a processor of a first node device of a cluster of node devices, facilitate performance of operations, the operations comprising:
maintaining a first instance of a memory table;
accessing the first instance of the memory table to serve first requests for entity metadata from the first node device;
maintaining a first instance of a shallow memory table at a second node device of the cluster of node devices, the first instance of the shallow memory table comprising data that backs up the first instance of the memory table at the first node device in a reduced size relative to the memory table;
processing the first instance of the memory table at the first node device into a second instance of the shallow memory table at the first node device independently of transferring the first instance of the shallow memory table from the second node device to the first node device;

processing the first instance of the shallow memory table at the second node device into a second instance of the memory table at the second node device independently of transferring the first instance of the memory table from the first node device to the second node device; and accessing the second instance of the memory table to serve second requests for entity metadata from the second node device.

16. The non-transitory machine-readable medium of claim 15, wherein the processing the first instance of the memory table at the first node device into the second instance of the shallow memory table at the first node device occurs in response to determining first workload-related information of the first node device and determining second workload-related information of the second node device.

17. The non-transitory machine-readable medium of claim 15, wherein the entity metadata comprises a tree of entity metadata, wherein the shallow memory table comprises tree identification information that identifies the tree of entity metadata and digests comprising second information corresponding to locations of records in a journal of the records, and wherein the locations correspond to entity updates applicable to the tree of entity metadata.

18. The non-transitory machine-readable medium of claim 15, wherein the entity metadata comprises a tree of entity metadata, wherein the shallow memory table comprises tree identification information that identifies the tree of entity metadata and digests comprising second information corresponding to locations of records in a journal of the records, and wherein the locations correspond to entity updates applicable to the tree of entity metadata.

19. The non-transitory machine-readable medium of claim 16, wherein the operations further comprise:
    determining the first workload-related information based on a size of the memory table on the first node device relative to a memory table buffer size of a first workload and a frequency of buffer dumps from a buffer to a nonvolatile storage.

20. The non-transitory machine-readable medium of claim 16, wherein the operations further comprise:
    determining the first workload-related information based on a size of the memory table and a frequency of dumps of the memory table to a nonvolatile storage.

* * * * *